US009326099B2

(12) United States Patent
Freeman et al.

(10) Patent No.: US 9,326,099 B2
(45) Date of Patent: Apr. 26, 2016

(54) SYSTEM AND METHOD FOR DETERMINING AUDIENCE CHARACTERISTICS OF A MUSIC CONCERT BASED ON MOBILE PHONE TRACKING AND MOBILE DATA TRANSMISSIONS

(71) Applicant: Popular Metrics, Inc., Atlanta, GA (US)

(72) Inventors: Duncan Freeman, Atlanta, GA (US); John Elmore, Atlanta, GA (US)

(73) Assignee: Popular Metrics, Inc., Atlanta, GA (US)

( * ) Notice: Subject to any disclaimer, the term of this patent is extended or adjusted under 35 U.S.C. 154(b) by 0 days.

(21) Appl. No.: 13/694,804

(22) Filed: Jan. 9, 2013

(65) Prior Publication Data

US 2015/0148071 A1 May 28, 2015

Related U.S. Application Data

(63) Continuation-in-part of application No. 12/322,625, filed on Feb. 4, 2009, and a continuation-in-part of application No. 12/927,030, filed on Nov. 5, 2010, now Pat. No. 9,122,749.

(Continued)

(51) Int. Cl.
*H04W 24/00* (2009.01)
*H04W 4/02* (2009.01)
*G06Q 30/02* (2012.01)

(52) U.S. Cl.
CPC ........... *H04W 4/023* (2013.01); *G06Q 30/0201* (2013.01); *G06Q 30/0205* (2013.01)

(58) Field of Classification Search
CPC ........ G06Q 30/02; G06Q 50/01; H04L 51/32; H04L 12/1818; H04L 65/403; H04L 12/588; H04L 65/4076; H04L 65/1069; H04L 65/1093; H04L 43/08; H04L 47/70; H04L 63/10; H04L 67/108; H04N 21/44204
USPC ....................................................... 455/456.2
See application file for complete search history.

(56) References Cited

U.S. PATENT DOCUMENTS

| | | |
|---|---|---|
| 6,117,011 A | 9/2000 | Lvov |
| 6,241,608 B1 | 6/2001 | Torango |
| 6,364,767 B1 | 4/2002 | Brossard et al. |
| 7,548,915 B2 | 6/2009 | Ramer et al. |
| 7,647,330 B2 | 1/2010 | Rieffanaugh, Jr. |

(Continued)

OTHER PUBLICATIONS

Elmore, John Edward; Non-Final Office Action for U.S. Appl. No. 12/322,625, filed Feb. 4, 2009, mailed Aug. 4, 2011, 15 pgs.
Elmore, John Edward; Final Office Action for U.S. Appl. No. 12/322,625, filed Feb. 4, 2009, mailed Mar. 13, 2014, 27 pgs.
Elmore, John Edward; Final Office Action for U.S. Appl. No. 12/322,625, filed Feb. 4, 2009, mailed May 9, 2012, 17 pgs.
Elmore, John Edward; Non-Final Office Action for U.S. Appl. No. 12/322,625, filed Feb. 4, 2009, mailed May 15, 2013, 17 pgs.
Elmore, John Edward; Non-Final Office Action for U.S. Appl. No. 12/322,625, filed Feb. 4, 2009, mailed Jul. 2, 2014, 31 pgs.

(Continued)

*Primary Examiner* — Kwasi Karikari
(74) *Attorney, Agent, or Firm* — Taylor English Duma LLP

(57) ABSTRACT

A concert profiling server (CPS) obtains and analyzes information about a venue hosting a music concert and mobile phone location information related to the audience members attending the concert. Based on this information, the CPS determines the size of the audience in attendance. The CPS also obtains and analyzes sentiment information related to audience members at the concert with which the CPS determines the audience's sentiment toward the concert as favorable or unfavorable. The CPS further obtains and analyzes other information with which it makes a profile of the demographics of the audience and the audience members' levels of engagement.

16 Claims, 6 Drawing Sheets

Related U.S. Application Data

(60) Provisional application No. 61/631,702, filed on Jan. 10, 2012, provisional application No. 61/280,244, filed on Nov. 2, 2009, provisional application No. 61/065,284, filed on Feb. 11, 2008.

(56) References Cited

U.S. PATENT DOCUMENTS

| | | | |
|---|---|---|---|
| 8,005,856 | B2 | 8/2011 | Spitzer-Williams et al. |
| 8,015,123 | B2 | 9/2011 | Barton et al. |
| 8,166,029 | B2 | 4/2012 | Park et al. |
| 8,221,225 | B2 | 7/2012 | Laut |
| 8,255,488 | B2 | 8/2012 | Tanaka et al. |
| 8,417,713 | B1 | 4/2013 | Blair-Goldensohn et al. |
| 9,122,749 | B2 | 9/2015 | Elmore et al. |
| 2004/0153389 | A1 | 8/2004 | Lortscher |
| 2005/0003878 | A1 | 1/2005 | Updike |
| 2005/0075164 | A1 | 4/2005 | Krynicky |
| 2006/0031483 | A1 | 2/2006 | Lund et al. |
| 2006/0063580 | A1 | 3/2006 | Nguyen et al. |
| 2006/0211465 | A1 | 9/2006 | Moshal |
| 2007/0016599 | A1 | 1/2007 | Plastina et al. |
| 2007/0088727 | A1 | 4/2007 | Kindig |
| 2007/0173309 | A1 | 7/2007 | Rigsby |
| 2008/0040235 | A1 | 2/2008 | Avedissian |
| 2008/0062318 | A1 | 3/2008 | Ellis et al. |
| 2008/0076504 | A1 | 3/2008 | Jenkins |
| 2008/0182563 | A1 | 7/2008 | Wugofski et al. |
| 2008/0228511 | A1 | 9/2008 | Barden |
| 2008/0257134 | A1 | 10/2008 | Oppenheimer |
| 2008/0288326 | A1 | 11/2008 | Abramowicz |
| 2009/0177969 | A1 | 7/2009 | Jones et al. |
| 2009/0182725 | A1 | 7/2009 | Govani et al. |
| 2009/0186679 | A1 | 7/2009 | Irvine et al. |
| 2009/0325715 | A1 | 12/2009 | Kelly et al. |
| 2010/0041482 | A1 | 2/2010 | Kumar et al. |
| 2010/0048302 | A1 | 2/2010 | Lutnick et al. |
| 2010/0121857 | A1 | 5/2010 | Elmore et al. |
| 2010/0198584 | A1 | 8/2010 | Habu et al. |
| 2010/0203938 | A1 | 8/2010 | Alderucci et al. |
| 2010/0241723 | A1 | 9/2010 | Dornbush |
| 2011/0045911 | A1 | 2/2011 | Parham |
| 2011/0055223 | A1 | 3/2011 | Elmore et al. |
| 2011/0077075 | A1 | 3/2011 | Aaron |
| 2011/0256925 | A1 | 10/2011 | Schipani et al. |
| 2011/0295577 | A1* | 12/2011 | Ramachandran ............... 703/6 |
| 2012/0058813 | A1 | 3/2012 | Amaitis et al. |
| 2013/0090157 | A1 | 4/2013 | Tharp |
| 2013/0116032 | A1 | 5/2013 | Lutnick |

OTHER PUBLICATIONS

Elmore, John Edward; Non-Final Office Action for U.S. Appl. No. 12/322,625, filed Feb. 4, 2009, mailed Sep. 23, 2014, 31 pgs.

Elmore, John Edward; U.S. Patent Application entitled: Internet Based Method and System for Ranking Artists Using a Popularity Porfile, having U.S. Appl. No. 12/322,625, filed Feb. 4, 2009, 46 pgs.

Elmore, John; Final Office Action for U.S. Appl. No. 12/927,030, filed Nov. 5, 2010, mailed May 9, 2012, 12 ps.

Elmore, John; Final Office Action for U.S. Appl. No. 12/927,030, filed Nov. 5, 2010, mailed Sep. 29, 2014, 14 pgs.

Elmore, John; Issue Notification for U.S. Appl. No. 12/927,030, filed Nov. 5, 2010, mailed Aug. 12, 2015, 1 pg.

Elmore, John; Non-Final Office Action for U.S. Appl. No. 12/927,030, filed Nov. 5, 2010, mailed Jan. 27, 2012, 11 pgs.

Elmore, John; Non-Final Office Action for U.S. Appl. No. 12/927,030, filed Nov. 5, 2010, mailed Dec. 27, 2012, 11 pgs.

Elmore, John; Non-Final Office Action for U.S. Appl. No. 12/927,030, filed Nov. 5, 2010, mailed Sep. 4, 2013, 13 pgs.

Elmore, John; Notice of Allowance for U.S. Appl. No. 12/927,030, filed Nov. 5, 2010, mailed May 4, 2015, 15 pgs.

Elmore, John; Supplemental Notice of Allowability for U.S. Appl. No. 12/927,030, filed Nov. 5, 2010, mailed Jul. 15, 2015, 6 pgs.

Elmore, John; U.S. Patent Application entitled: Internet Based System and Method for Wafering on an Artist, having U.S. Appl. No. 12/927,030, filed Nov. 5, 2010, 19 pgs.

Emore, John; Non-Final Office Action for U.S. Appl. No. 12/927,030, filed Nov. 5, 2010, mailed Jan. 22, 2015, 11 pgs.

Elmore, John; U.S. Continuation Application entitled: Internet Based System and Method for Wagering on an Artist having U.S. Appl. No. 14/819,805, filed Aug. 6, 2015, 21 pgs.

Elmore, John Edward; U.S. Provisional Application entitled: Internet Based Method and System for Ranking Artists Using a Popularity Profile, having U.S. Appl. No. 61/065,284, filed Feb. 11, 2008, 29 pgs.

Elmore, John Edward; Notice of Allowance for U.S. Appl. No. 12/322,625, filed Feb. 4, 2009, mailed Dec. 29, 2015, 17 pgs.

Freeman, Duncan; U.S. Continuation Application entitled: Internet Based Method and System for Ranking Artists Using a Popularity Profile having U.S. Appl. No. 15/062,386, filed Mar. 7, 2016, 54 pgs.

Freeman, Duncan; U.S. Continuation Application entitled: System and Method for Determining Audience characteristics of a Music Concert Based on Mobile Phone Tracking and Mobile Data Transmissions, having U.S. Appl. No. 15/062,392, filed Mar. 7, 2016, 26 pgs.

* cited by examiner

SYSTEM AND METHOD FOR DETERMINING AUDIENCE CHARACTERISTICS OF A MUSIC CONCERT BASED ON MOBILE PHONE TRACKING AND MOBILE DATA TRANSMISSIONS

CROSS-REFERENCES TO RELATED APPLICATIONS

This application claims the benefit of U.S. provisional patent application Ser. No. 61/631,702, filed Jan. 10, 2012. This application is a continuation-in-part of U.S. patent application Ser. No. 12/927,030, filed Nov. 5, 2010, which claimed the benefit of U.S. provisional patent application Ser. No. 61/280,244, filed Nov. 2, 2009, which are incorporated herein by reference. This application is also a continuation-in-part of U.S. patent application Ser. No. 12/322,625, filed Feb. 4, 2009, which claimed the benefit of U.S. provisional patent application Ser. No. 61/065,284, filed Feb. 11, 2008, which are incorporated herein by reference.

BACKGROUND OF THE INVENTION

1. Field of the Invention

This invention relates generally to the field of mobile geolocation and mobile based applications. It pertains specifically to a system and method for determining audience characteristics of a music concert based on the analysis of mobile phone tracking and mobile data transmissions. In the preferred embodiment, the system tracks, and analyzes mobile data, activity and transmissions, providing audience characteristics of a music concert, including, but not limited to demographics, sentiment, engagement, popularity and segmentation.

2. Description of Related Art

The conventional means of determining the audience size at a music concert, apart from counting people who attend, is to count the number of tickets sold. Information on ticket sales is sometimes available from ticket sales service providers such as TicketMaster. Yet counting tickets can be impractical. Some venues, particularly smaller ones, may not use an accessible ticket sales service like TicketMaster, or may not sell tickets at all. Even if ticket sales were accessible, audience size may not reflect ticket sales if some ticket holders do not attend or some tickets are given away and not accounted for in sales. Moreover, tickets sales alone provide little or no information about the concert, for example, an audience's sentiment about the concert.

Meanwhile, mobile phone use has become nearly ubiquitous. By the end of 2008, for example, there were more than 270 million cell phone subscriptions in the United States, which represents about 87% of the total U.S. population, according to the International Association for the Wireless Telecommunications Industry. With the improvement of mobile phone tracking technology and the increasing incorporation of global positioning system (GPS) technology into mobile phones, the field of mobile data analytics has emerged, which uses location information to understand the behavior of mobile phone users, often in real-time.

A number of research efforts and companies have been formed to exploit this new field. SenseNetworks, for example, is a pioneering company in the field of mobile data analytics. It tracks the location of mobile phone users in real-time, segments them into groups based on common behaviors and locations, and makes predictions about future behavior. One of its applications, called CitySense, tracks the overall activity of a city based on location data and indicates the "hotspots" of activity, such as nightclubs and other venues, wherein activity is defined essentially as the collective presence of active mobile phones at a location. The level of activity of a venue is gauged relative to its historical activity as well as the activity observed at other venues. However, while CitySense application tracks the number of mobile devices at a venue, it makes no determination of the size or sentiment of an audience attending a concert at a venue, the audience's perception of the performance of the concert, the anticipation of the concert, the audience's demographics, the audience's engagement with the artist(s) performing during the concert or other audience participant characteristics, etc.

There are a number of mobile applications that concert goers currently use on their mobile phones when attending concerts. For example, Facebook, for determining which of their friends is also at the concert; Foursquare, for checking into a concert venue to learn tips about the concert venue, or special offers from the concert venue; Flickr, for sharing pictures of the concert; YouTube, for sharing video clips of the concert; and, Twitter, for sharing thoughts about the concert, to name a few mobile applications. However, to date, none of these mobile applications are focused on understanding the audience size and sentiment by amalgamating, tracking and analyzing mobile phone data, activity and transmissions.

Further, all of the aforementioned mobile phone applications have Application Programming Interfaces (APIs), where certain data, if applicable, may be imported from the aforementioned sources, or other third party sources. For reference herein, APIs, are particular specifications that the Concert Profiling System will utilize, to access and make use of services, information, data and/or resources, etc., that are provided by a particular software program that implements the API.

What is lacking in the prior art is a means not only to observe the number of active mobile phones at a venue but also a means to determine the size and sentiment of an audience attending a concert at the venue where the mobile phone activity is observed.

SUMMARY

In view of the limitations now present in the prior art, the present invention provides a new and useful system and method for determining audience characteristics of a concert, such as the size and sentiment of an audience attending a concert at a venue where mobile phone activity is observed, the audience's perception of the performance of the concert, the anticipation of the concert, the audience's demographics, the audience's engagement with the artist(s) performing during the concert or other audience participant characteristics, etc. It is also a purpose of the present invention to provide a new system and method for determining the size, demographics, engagement and sentiment of an audience attending a concert at a venue based on mobile phone location tracking and audience feedback (e.g. comments, photos, video, etc.) which are sent via mobile devices, and thus, this invention has many novel features not offered by the prior art applications that result in a new system and method which is not apparent or obvious, either directly or indirectly by any of the prior art applications. This system is referred to herein as the Concert Profiling System (CPS).

The goal of present invention disclosed herein, is to determine the characteristics of an audience attending a concert, such as the size and sentiment of an audience attending a concert at a venue where mobile phone activity is observed, the audience's perception of the performance of the concert, the anticipation of the concert, the audience's demographics, the audience's engagement with the artist(s) performing during the concert or other audience participant characteristics, etc. In the preferred embodiment, a venue is any location hosting a music related performance such as a concert, ranging from a small night club or auditorium, to a large theater or coliseum. Venues may also include outdoor locations such as parks, fields and amphitheaters.

A network-based system utilizes signals from cell phones to derive their location, utilizing one or several signal towers (base stations) to take distance measurements. These measurements are then sent to a location center where the subscriber's position is calculated, such as by triangulation of the signals. There is no requirement to make any changes to the current handsets. However, the cell phone must be in active mode (i.e., in "talk" mode or sending a signal through the control channel) to enable location measurement. According to Openwave, Inc., the network-based system has an accuracy of 50 to 200 meters if the triangulation is employed and up to 300 meters for other methods.

A handset-based system, on the other hand, typically relies on GPS enabled mobile phones. The GPS unit in the handset determines the location of a mobile phone based on signals received from satellites, and this information is relayed from the mobile phone to a central processing system maintained by the mobile phone carrier. As GPS chips become a staple component of the mobile phone, this method is becoming the predominant one. According to Openwave, Inc., the handset-based system has an accuracy of 5 to 30 meters, depending on characteristics of the surrounding environment, and is typically less than 15 meters. This accuracy is expected to improve over time with technological advancements as well as the use of the network-based system in conjunction with GPS technology with.

Additionally, smartphones are experiencing accelerated rates of adoption, which means larger, and more complex data will be transmitted with greater frequency by larger numbers of users. According to Berg Insight, in March of 2011, smartphone shipments increased 74% from 2009 to 2010, and according to ComScore, over 45.5 million people in the United States owned smartphones in 2010. For reference herein, smartphones, such as the iPhone and Android offer advanced mobile computing capability, allowing end-users to install and run advanced applications and games.

Generally speaking, in the preferred embodiment, a location data provider will provide to the CPS at least the longitude and latitude coordinates, also known as a geolocation, for active mobile phones within a requested geographical area for a given time period. This data may be provided in near real-time, at a regular time interval, upon request by the CPS, or upon the trigger of an event or action. Such information may include the physical dimensions of a venue, the venue's seating and operating capacity, and its availability and hours of operation, which may also be obtained from companies like Songkick, Bandsintown, OnlineGigs and Ticketmaster, either directly, or through their API(s).

Still another means of determining geolocation in the preferred embodiment is to receive location information from players of Music Scout, a game and utility application. A Music Scout application operates on a player's mobile phone and determines the location of the mobile phone by accessing the mobile phone's GPS unit or by asking the player to provide the location such as selecting the present location from a list of locations.

Based in part on the location data received for a venue, the CPS calculates metrics such as the size of the audience in attendance at the venue for a concert (number of persons) and the ratio of attendance to capacity of the venue. In the preferred embodiment, it can also archive historical location data for a venue, showing traffic to and from the venue over a time period, and calculate metrics such as average persons in attendance and the ratio of current attendance to average attendance. These averages may be calculated for certain historical time periods or for past concerts.

In determining certain metrics such as audience size, it is typically necessary for the CPS to perform calculations based on more information than the location data. These calculations may involve using additional information provided by other applications and/or by entities such as mobile phone carriers, federal government agencies such as the Federal Communications Commission (FCC), and third party research firms. Such information may include the physical dimensions of a venue, the venue's seating and operating capacity, and its availability and hours of operation. It may also include mobile phone coverage and market penetration data.

The CPS may also calculate metrics pertaining to the sentiment of an audience about a concert from qualitative information it receives. In the preferred embodiment, the CPS may receive sentiment information from Music Scout. During a concert, players of Music Scout provide sentiment information using their mobile phones. A player can "rate" his experience at the concert and/or "rate" the performance of a music artist by via a Music Scout application running on the player's mobile phone. By way of example, a player could select a rating between 1 (poor) and 5 (great) to indicate his sentiment. The player's measure of sentiment is examined collectively with other players at the same concert and may be used to provide a measure of sentiment for the whole audience. In the preferred embodiment, the CPS may receive sentiment information from the Popularity Profiling System (PPS) server as discussed in U.S. patent application Ser. No. 12/322,625.

In the preferred embodiment, the CPS may receive and/or provide data, including, but not limited to, audience sentiment and size characteristics to the Wagering System, U.S. patent application Ser. No. 12/927,030.

In the preferred embodiment, the CPS may receive sentiment information from the Popularity Profiling System (PPS) server, which is described in U.S. patent application Ser. No. 12/322,625. The PPS server may process sentiment information in the form of people's comments on social networking sites such as Facebook, Twitter and Foursquare, and related web-based applications where the comments can be associated reliably with a concert at a venue. An example of associating comments with a concert is through the examination of metadata for pictures posted to social networking sites, such as Flickr, wherein people typically have the ability to post comments about a particular picture posted. Pictures are stored according to image file formats and several of these formats, including Exif (used by digital cameras), support the recording of time, date and geolocation information. Similarly, relevant location information may be obtained from social media applications such as Twitter, Facebook and Foursquare.

In the preferred embodiment, once the CPS has performed its calculations of size, sentiment and any other metrics, these metrics are made available to one or more applications (or otherwise placed in a database accessible by one or more applications). One application that may use these metrics is the PPS, wherein the metric(s) may be incorporated as part of an artist's popularity profile. Music Scout is another application that may use these metrics.

DETAILED DESCRIPTION

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

Figure 1:
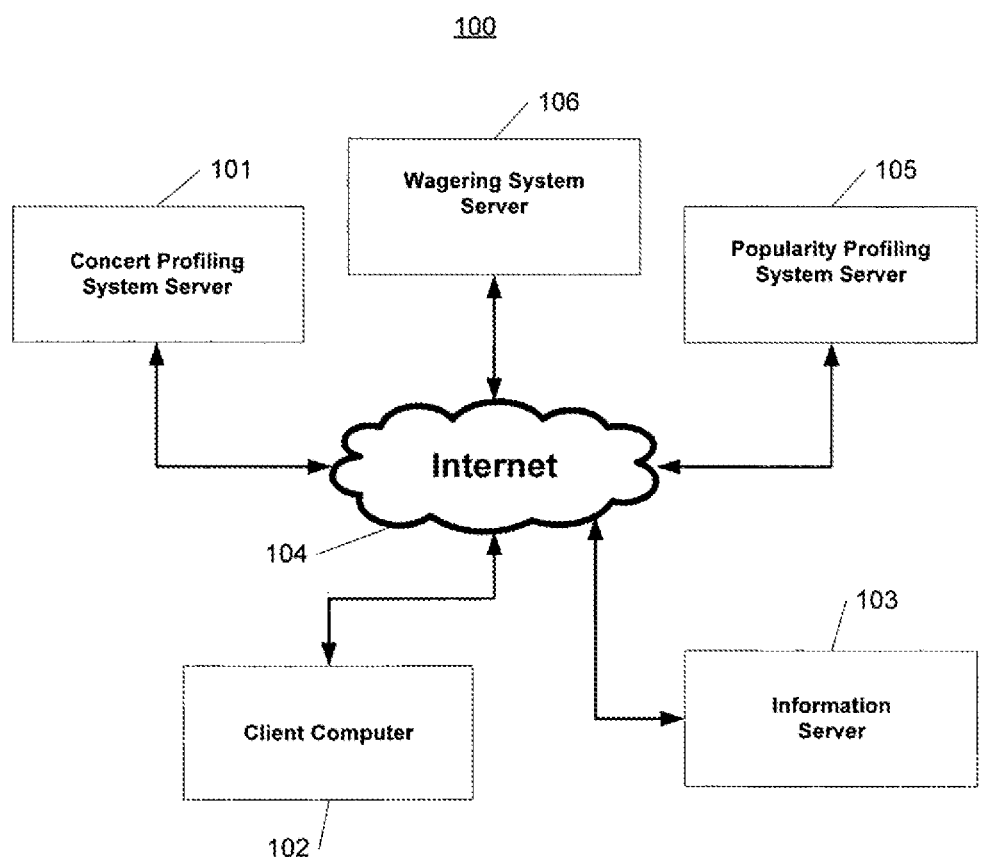
FIG. 1 is a diagram illustrating the server/client network relationship of the Concert Profiling System server, information server(s) and client(s).

FIG. 1 illustrates a computing environment in which preferred embodiments are implemented. The computing environment 100 includes the Concert Profiling System (CPS) Server 101, at least one client computer 102, and at least one information server 103 that communicate over the Internet 104. An information server 103 represents any source of data provided by through a server, including location data from a service like AirSage, Inc. or Skyhook, Inc., or any other third party application. In the preferred embodiment, a Popularity Profiling System Server 105, described in U.S. patent application Ser. No. 12/322,625, and/or a Wagering System Server 106, described in U.S. patent application Ser. No. 12/927,030, communicates with the CPS Server 101 via the Internet. Each server shown in FIG. 1 is identified with a unique Internet Protocol (IP) address. A client computer 102 can be any computing device seeking services from the CPS including mobile computers such as laptop computers, tablets, and smartphones. Computer software operating within this environment 100 may employ software and methods of application, including various pieces of code, including, but not limited to, Ruby, Erlang, PHP, Perl, ASP, Java, Javascript, Flash, SOAP, DHTML, HTML, XML, JSON, RSS, VML, Ajax, JQuerry, Python, Cocoa and C/C++/C#.

All computing devices 101, 102, 103, 105 and 106 communicate using a document transfer protocol such as Hypertext Transfer Protocol, or any other document transfer protocol known in the art, such as FTP, Gopher, WAIS, XMLP, etc. Typically, the client 102 includes a browser program, such as an HTML browser, capable of submitting requests using the HTTP protocol in a manner known in the art. The client 102 may also be an application other than a browser, such as a rich internet application, capable of exchanging data and interfacing with a user.

Figure 2:
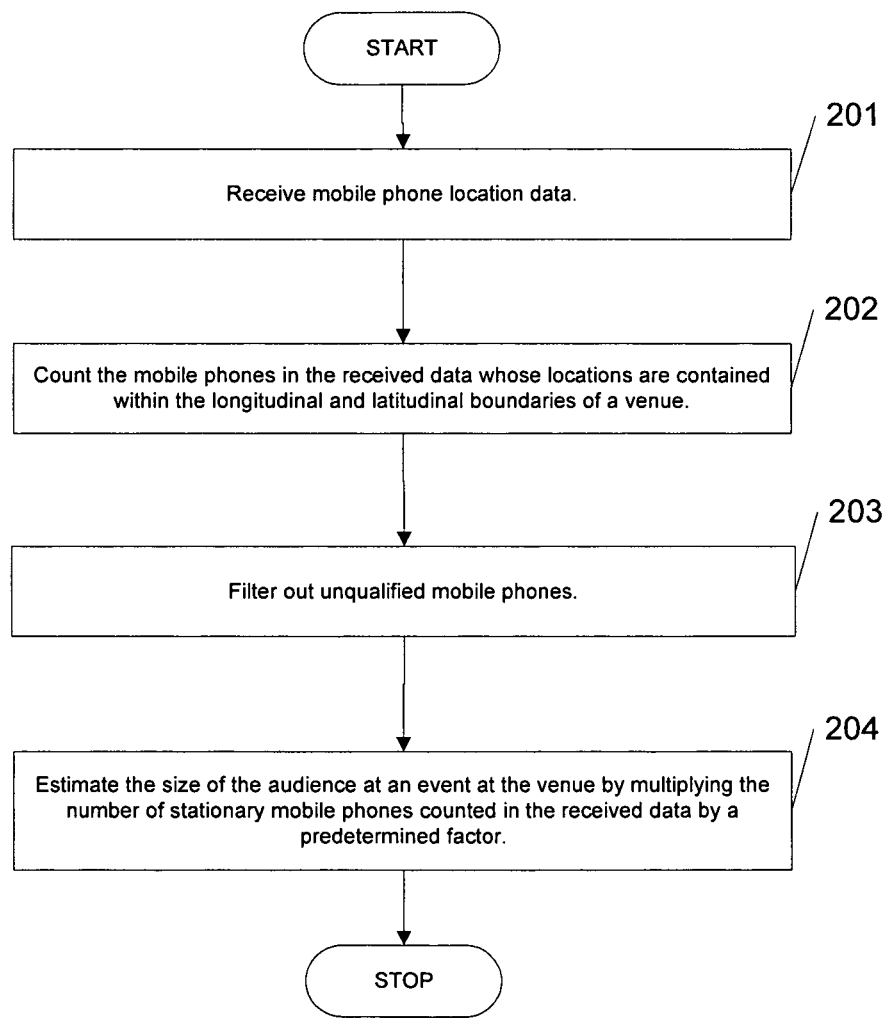
FIG. 2 illustrates a typical process in the preferred embodiment of the Concert Profiling System for calculating the size of an audience of a concert at a venue.

FIG. 2 illustrates a typical process for calculating the size of an audience of a concert at a venue in the preferred embodiment of the CPS 200 which operates on the CPS Server 101. At step 201, mobile phone location data is received from a data provider. The data associated with each mobile phone being tracked is comprised typically of a unique identification number, location coordinates, and an operation timestamp.

The data is examined by the CPS 200 at step 202 to count the number of unique mobile phones whose geolocation coordinates are contained within the longitudinal and latitudinal boundaries of a venue being monitored by the CPS 200, such as a venue associated with a concert occurring at the same time as the timestamp indicated by the location data. The count will at least represent the number of mobile phones within the venue boundary at a particular time. The CPS 200 may also count the cumulative number of mobile phones that have entered the venue boundary over a period of time. These counts may be different if the attendance at a venue exhibits churn.

Alternatively, in step 202, a location will be considered to be contained within a venue boundary if it resides within a predefined margin outside the boundary. This margin of error may correspond to the limitations on the accuracy of location measurements performed by the carriers. If the data is received from Music Scout and the venue has been verified by the player, then the mobile phone is counted along with those within the venue boundary.

A venue location may be defined as a pair of longitudinal and a latitudinal coordinates, herein referred to as a center point. A venue boundary may be defined as a series of vertices of longitudinal and latitudinal coordinates that would form a perimeter around the center point if edges connected them together. In the preferred embodiment, a venue boundary is defined either (1) as a rectangle wherein a first vertex corresponds to the northernmost direction, a second vertex corresponds to the easternmost direction, a third vertex corresponds to the southernmost direction, and a fourth vertex corresponds to the westernmost direction; or (2) as a rectangle wherein a first vertex corresponds approximately to the northwest direction, a second vertex corresponds approximately to the northeast direction, a third vertex corresponds approximately to the southeast direction, and a fourth vertex corresponds approximately to the southwest direction. All directions are provided relative to the center point. A venue boundary typically corresponds to the approximate footprint of the building or physical structure or property line of the venue.

In step 203, unqualified mobile phones are "filtered out" or removed from the count by the CPS 200. In the preferred embodiment, a mobile phone is considered unqualified if it is non-stationary or if it is associated with employees of the venue. A non-stationary mobile phone is one whose location falls within the venue boundary for a brief time period (i.e. less than five minutes) and then moves out of it. A typical non-stationary mobile phone represents a person who passes near or through a venue on his way to another location outside of the venue boundary. Due to the margin of error in the accuracy of location measurements, some persons passing near a venue, such as walking on a sidewalk in front of a night club, may be included in the count of mobile phones considered to be within the venue boundary. Or some persons may pass through a venue, such as an outdoor plaza, on their way to another establishment, with no intention of staying at the plaza. A mobile phone may initially be considered to be qualified if its location falls within the venue boundary. But if subsequent tracking of the same mobile phone shows that the mobile phone has exited the venue boundary before a brief threshold time period has passed, such as one or several minutes, then that mobile phone will be considered unqualified. A mobile phone also will be considered unqualified if it loses or drops its signal with a base station for a brief threshold period of time. Similarly, if the historical pattern of movement of a mobile phone suggests the owner/user of the phone is a venue employee, such as exhibiting a regular work schedule over a period of days or weeks, then that mobile phone will be considered unqualified. Further, the mobile phone will be considered unqualified if the owner/user is identified with the police, fire or other municipal authority. Any other means of determining whether a mobile phone is unqualified may be utilized. In circumstances where the determination of unqualified mobile phones is not readily ascertainable, all mobile phones may be considered qualified.

In an alternative embodiment, steps 202 and 203 may be combined in order to count only qualified mobile phones. The filtering and the counting are thus part of the same step. In this regard, only mobile phones are counted that do not belong to venue employees, if this can be determined, and have remained within the venue boundary for a brief threshold period of time.

In step 204, the CPS 200 estimates the size of the audience by multiplying the count of qualified mobile phones with a predetermined factor. This factor is a number representing a ratio of qualified mobile phone users in attendance to total expected audience size. It is predetermined in the sense that it has already been calculated or is readily calculable at the time it is utilized in step 204. In the preferred embodiment, the factor is comprised, but not limited to, a penetration rate and an availability rate.

The penetration rate is the ratio of persons possessing a mobile phone to persons not possessing a mobile phone in the general population or among a subset of the population defined by demographic criteria such as age, education, socio-economic status, and geographic location. The penetration rate used in determining the factor may depend on the demographic profile of the audience at a concert at a venue. A means of understanding the demographic profile of an audience is to utilize the popularity profile of a music artist performing at the concert or at comparable past concerts at the venue as provided by the PPS Server 105, described in U.S. patent application Ser. No. 12/322,625. A typical popularity profile may include the artist's genre of music, demographic information about his fans and supporters, and other information indicative of the type of audience he is likely to attract to the venue.

The availability rate is the ratio of persons in the population who own a mobile phone but whose mobile phone cannot be tracked for some reason, comprising at least the following circumstances: (1) owner forgot or chose not to bring the phone, (2) owner turned off the phone, (3) phone has a dead battery, or (4) phone has a malfunction. The first three items can be reasonably estimated through market studies and surveys of consumer experience with mobile phones. The likelihood of phone malfunction can be reasonably estimated from customer complaint and product return statistics compiled by mobile phone manufacturers and providers.

The size at time t of an audience attending a concert at a venue v, $S_{v,t}$, can be represented by Equation 1 below.

$$S_{v,t} = [C_{total,v,t} - C_{unqualified,v,t}] * F_v(R_{p,d}, R_{a,d}),\quad\text{Equation 1:}$$

where $C_{total,t}$ is the total count of mobile phones at time t within the venue boundary of venue v, $C_{unqualified,t}$ is the count of unqualified mobile phones at time t, and $F_v$ is the predetermined factor associated with venue v, which is a function of $R_{p,d}$, the penetration rate for the subset of the population fitting a particular demographic profile d, and $R_{a,d}$, the availability rate for the subset of the population fitting a particular demographic profile d.

The CPS 200 may also calculate a measure of audience size representing the cumulative audience size for a concert at a venue. This is accomplished in the same manner as above except that the cumulative count for a given time period is used instead of the count at a particular time, as discussed for step 202. Similar to Equation 1, the cumulative size for the time period t1 to t2 of an audience attending a concert at a venue v, $S_{cumulative,v,t1,t2}$, can be represented by Equation 2 below.

$$S_{cumulative,v,t1,t2} = [C_{cumulative\_total,v,t1,t2} - C_{cumulative\_unqualified,v,t1,t2}] * F_v(R_{p,d}, R_{a,d})\quad\text{Equation 2:}$$

where $C_{cumulative\_total,t}$ is the cumulative total count of mobile phones during the time period t1 to t2 within the venue boundary of venue v and $C_{cumulative\_unqualified,t}$ is the cumulative count of unqualified mobile phones during the time period t1 to t2.

In an alternative embodiment, data collected from steps 202 through 204 may be collected from, or in combination with, other mobile phone location data from third party companies such as FourSquare, Twitter and Facebook via their APIs.

Figure 3:
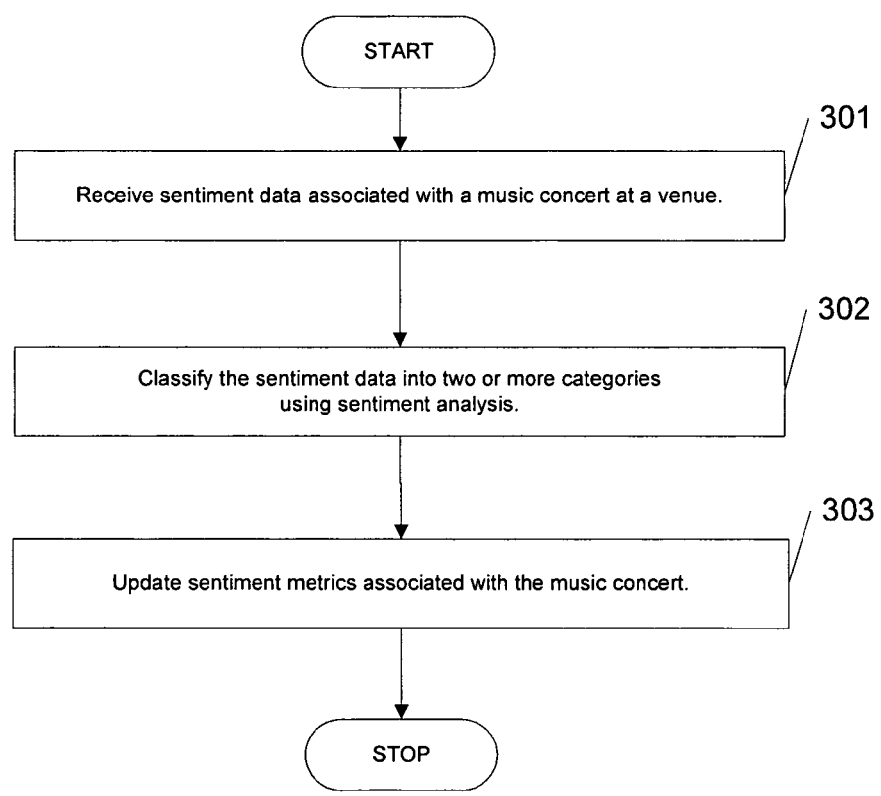
FIG. 3 illustrates a typical process in the preferred embodiment of the Concert Profiling System for calculating the sentiment of an audience of a concert at a venue.

FIG. 3 illustrates a typical process for calculating the sentiment of an audience of a concert at a venue in the preferred embodiment of the CPS 200. At step 301, the CPS 200 receives sentiment data associated with a concert at a venue. The sentiment data may be retrieved or sent from the Music Scout (software application), Fandom (software application), the PPS Server 105, described in U.S. patent application Ser. No. 12/322,625, or another source, represented as an information server 103. This data may be provided in near real-time, at a regular time interval, upon request, or upon the trigger of a concert or action. In the preferred environment, the Music Scout "pushes" or sends sentiment data to the CPS 200 upon being generated by a player.

In step 302, the sentiment data is classified into two or more categories. The two most basic categories of sentiment are favorable and unfavorable, which can be represented quantitatively as 1 and −1 (or in the alternative, as −1, 0, 1 representing unfavorable, ambivalent/undetermined, and favorable). These categories reflect whether a person's expression of sentiment about an object or activity related to a concert is favorable (positive, affirming, agreeable, approving, pleasing, etc.) or not. The number of categories may be expanded to reflect a greater range of sentiment, such as a five-point rating system as follows: strong disapproval, modest disapproval, ambivalence, modest approval, and strong approval, represented quantitatively as −2, −1, 0, 1, 2. In the preferred embodiment, the Music Scout application operating on a user's mobile phone would present the five categories of sentiment as described above to the user as part of a poll or question in which the user selects one of the categories.

Sentiment data typically consists of at least three types of information: (1) information identifying a particular music concert at a venue, (2) information describing a person's expression of sentiment about an object or activity related to a music concert, and (3) information identifying the source of the sentiment data. In the preferred embodiment, sentiment data received from the Music Scout application consists of at least (1) the name or identifying code of a particular concert at a venue, (2) a numerical rating, (3) information identifying the source as Music Scout, and (4) the time and date.

In step 303, all sentiment data associated with a concert at a venue is incorporated into a metric or set of metrics that describe the sentiment of the audience at the concert in aggregate. In the preferred embodiment, one metric calculated is the mean value of all sentiment data received from Music Scout for a concert at a particular time. Assuming Music Scout employed a five-point rating system as suggested above, a mean value of 1.0 would suggest an audience sentiment of modest approval. Audience sentiment, $\Psi_{audience}$, at time t is determined by Equation 3 below.

$$\Psi_{audience,t} = \frac{\sum \Psi_{user,n,t1,t2}}{n}, \quad \text{Equation 3}$$

where n number of users expressed sentiment $\Psi_{user}$ during time $t_1 \le t < t_2$ and
$\Psi_{user} = \{2, 1, 0, 4, -2\}$.

Another metric that may be calculated is a statistical confidence level indicating the extent to which the group of persons for which sentiment was measured correlates to the sentiment of the entire audience attending the concert. This may be determined by taking a linear regression of the sentiment measurements collected from the group, wherein the confidence level is derived from the variance of the fitted linear function.

Figure 4:
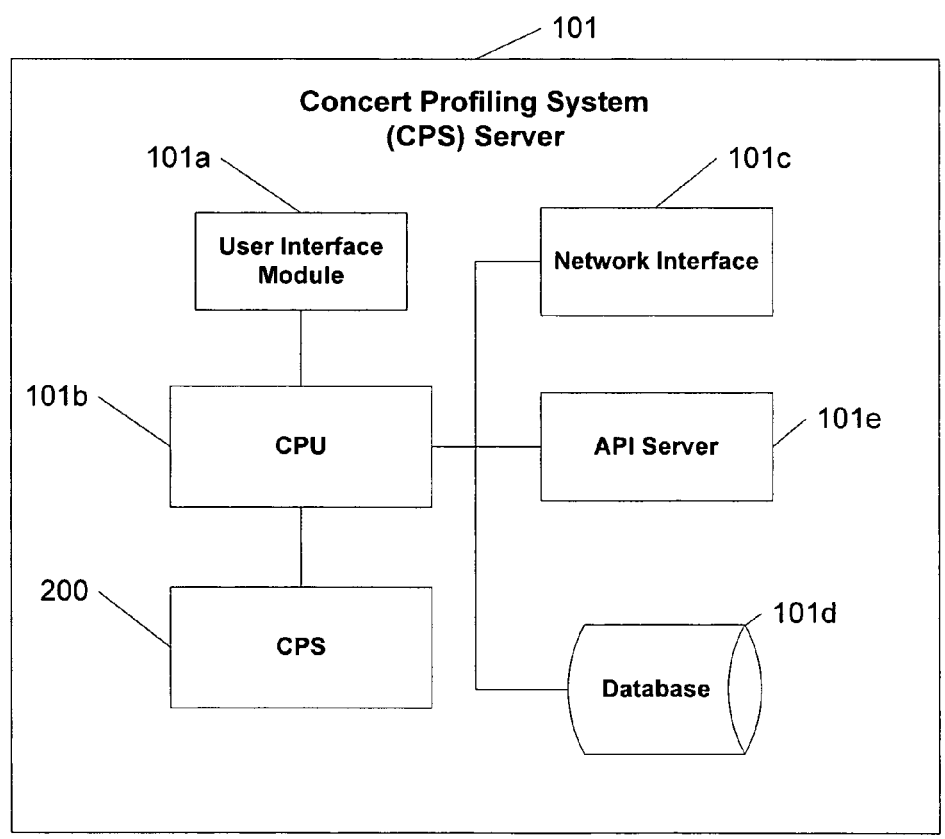
FIG. 4 illustrates the preferred embodiment of the system components of the Concert Profiling System server.
Figure 5:
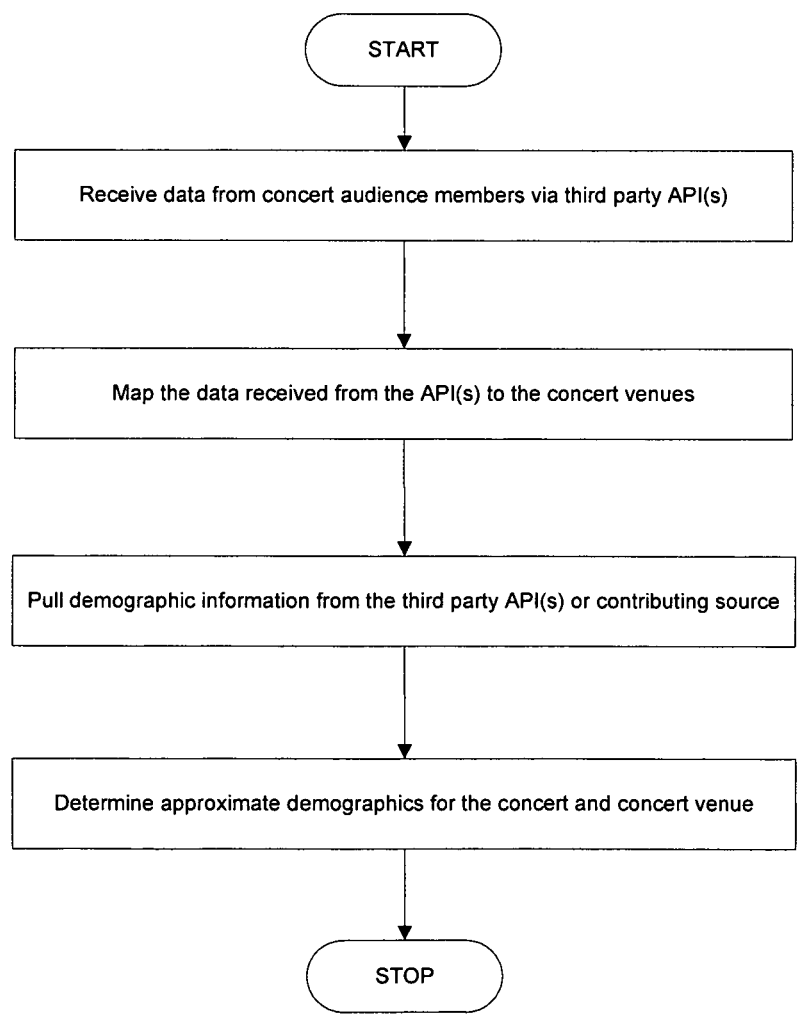
FIG. 5 illustrates how the Concert Profiling System determines approximate demographics based on the data it collects.
Figure 6:
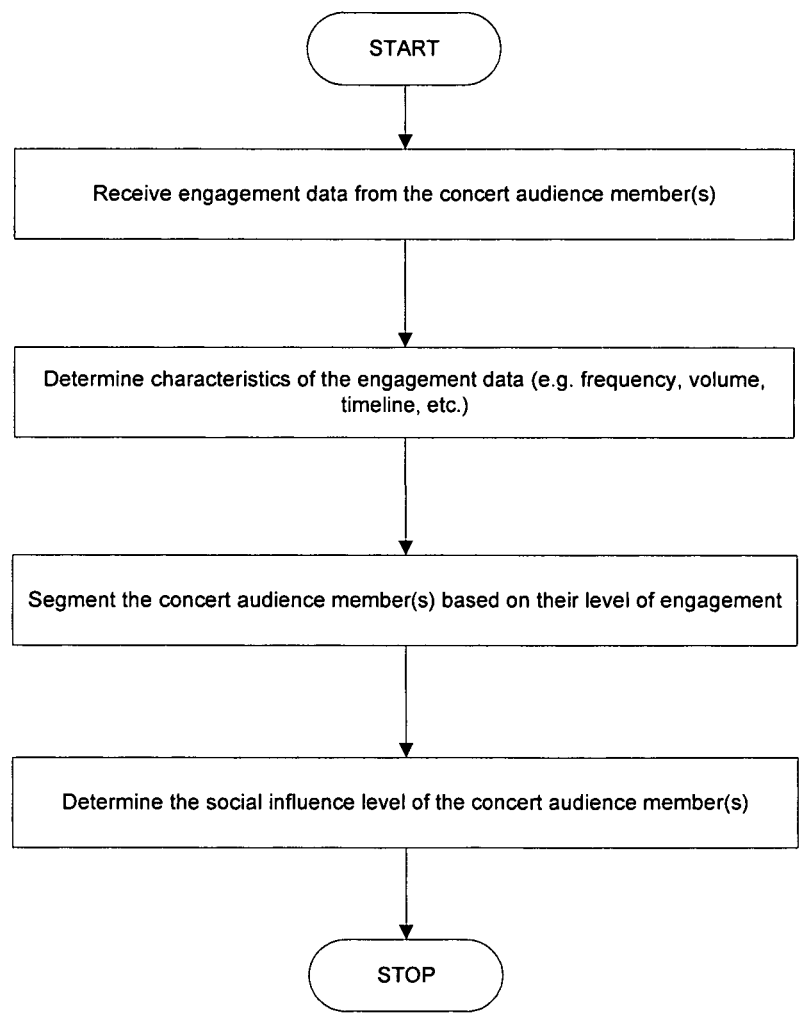
FIG. 6 illustrates how the system calculates engagement quantities and segments the fan engagement from the mobile data transmissions collected by the Concert Profiling System during a music concert.

FIG. 4 illustrates the system components of CPS server 101. The CPS server 101 comprises a user interface module 101a, a CPU 101b, a network interface 101c, a database 101d, an API Server 500, and the CPS 200. The user interface module 101a and the CPS 200 are software programs that are executed by the CPU 101b. The user interface module 101a communicates with client computer 102 via the network interface 101c, which connects the CPS server 101 to the Internet using a unique IP address. In the preferred embodiment, the user interface module 101a presents a web page to the client computer 102 that represents the Music Scout application for rendering in a browser. The user interface module 101a also provides web pages to a client computer 102 for administrative functions such as managing the data and setting the configuration of the CPS 200. The API Server 101e communicatively connects to APIs of third party applications. In an alternative embodiment, the CPS server 101 provides information to third party applications, including those other than Music Scout, via the API server 101e.

The CPS 200 performs analysis on the data contained in database 101d to determine size, sentiment and any other metrics related to audience characteristics at a music concert, as discussed in the balance of this specification. The CPS 200 is also responsible for sending and retrieving data from the PPS server 105, described in U.S. patent application Ser. No. 12/322,625. In the preferred embodiment, the CPS 200 sends an audience sentiment metric, described in Equation 3, and a size metric, described in Equation 2, at periodic time intervals to the PPS server 105, wherein the two metrics are associated with a particular music concert and one or more music artists.

The database 101d maintains records of at least the following:

(1) Data related to mobile phone locations from AirSage, SkyHook or another mobile phone location tracking company, the data for each mobile phone being tracked comprising:
  (a) Unique ID of the mobile phone (anonymized);
  (b) Geolocation coordinates; and
  (c) Timestamp.
(2) Venue geolocation boundary coordinates.
(3) Concert description information, including city and state location.
(4) User registration information (e.g. Music Scout application).

(5) Sentiment poll/question results per user, per concert, per time period.
(6) Sentiment and size metrics as determined by the CPS 200.

In an alternative embodiment, the CPS 200 can determine a correlation related to the size and sentiment of an audience at a music concert. One use of correlation is to determine whether sentiment of the audience depends on size, and if so, at what size audience does sentiment change significantly. Correlation between size and sentiment can be determined by known statistical methods in the art. As an example, the correlation between size, X, and sentiment, Y, can be described using Equation 4 below.

$$\rho(X, Y) = \text{corr}(X, Y) = \frac{\text{cov}(X, Y)}{\sigma_X \sigma_Y} = \frac{E[(X - \mu)]}{\sigma_X \sigma_Y} \quad \text{Equation 4}$$

where cov is the covariance, σ is the standard deviation, μ is the mean, and E is the expected value operator.

It will be clear to one skilled in the art that the above embodiments may be altered in many ways without departing from the scope of the invention.

What is claimed is:

1. A system for determining characteristics of an audience at a concert, comprising:
  a location information server for providing location information about a plurality of active mobile phones;
  a venue information server for providing information about a venue;
  a concert profiling server, comprising a processor configured to execute computer instructions to:
    obtain information from the location information server related to a plurality of active mobile phones at a geographical location during a time period in response to a request, the request including one or more identifiers of the geographical location and the time period;
    obtain information from the venue information server related to a venue hosting the concert during a time period in response to a request, the request including one or more identifiers of the venue and the time period; and
    determine one or more characteristics about the audience based on at least one of the location information and the venue information; and
  a popularity profiling server, wherein the processor of the concert profiling server is further configured to execute computer instructions to obtain from the popularity profiling server sentiment information relating to the audience in response to a request, the request including one or more identifiers of the concert;
  wherein the location information server, the venue information server and the concert profiling server communicate over a network.

2. The system of claim 1, wherein the one or more identifiers of the geographical location comprise at least one of a set of latitude and longitude coordinate pairs, a street address, and a place name.

3. The system of claim 1, wherein the one or more identifiers of the venue comprise at least one of a set of latitude and longitude coordinate pairs, a street address, and a place name.

4. The system of claim 1, wherein the one or more characteristics of an audience includes a maximum size of the audience during the time period.

5. The system of claim 1, wherein the one or more characteristics of an audience includes an average size of the audience during the time period.

6. The system of claim 1, wherein the one or more identifiers of the concert include a time period and at least one of a concert name, one or more identifiers of a venue, and a music artist name.

7. The system of claim 1, wherein the processor of the concert profiling server is further configured to execute computer instructions to aggregate the sentiment information and classify the aggregated sentiment information as either favorable or unfavorable with respect to the concert.

8. The system of claim 1, the system further comprising:
   a means for receiving, by the concert profiling server, engagement information about a plurality of concert audience members;
   a means to segment, by the concert profiling server, the plurality of concert audience members based on their level of engagement; and
   a means to determine, by the concert profiling server, a social influence level of each of the plurality of concert audience members.

9. The system of claim 1, the system further comprising:
   a means for determining, by the concert profiling server, demographic information about a plurality of concert audience members.

10. A method for determining characteristics of an audience at a concert, comprising:
    obtaining, by a concert profiling server, location information about a plurality of active mobile phones from a location information server in response to a request, the request including one or more identifiers of a geographical location and a time period;
    obtaining, by the concert profiling server, information related to a venue hosting the concert in response to a request from a venue information server, the request including one or more identifiers of the venue and a time period;
    obtaining, by the concert profiling server, sentiment information relating to the audience from a popularity profiling server in response to a request, the request including one or more identifiers of the concert; and
    determining one or more characteristics about the audience based on at least one of the location information and the venue information;
    wherein the location information server, the venue information server and the concert profiling server communicate over a network.

11. The method of claim 10, wherein the one or more identifiers of the geographical location comprise at least one of a set of latitude and longitude coordinate pairs, a street address, and a place name.

12. The method of claim 10, wherein the one or more identifiers of the venue comprise at least one of a set of latitude and longitude coordinate pairs, a street address, and a place name.

13. The method of claim 10, wherein the one or more characteristics of an audience includes a maximum size of the audience during the time period.

14. The method of claim 10, wherein the one or more characteristics of an audience includes an average size of an audience during the time period.

15. The method of claim 10, wherein the one or more identifiers of the concert include a time period and at least one of a concert name, one or more identifiers of a venue, and a music artist name.

16. The method of claim 10, wherein method further comprises:
    aggregating the sentiment information and classifying, by the concert profiling server, the aggregated sentiment information as either favorable or unfavorable with respect to the concert.

* * * * *